H. G. O. PABST.
FEATHER-RENOVATOR.

No. 185,868. Patented Jan. 2, 1877.

Witnesses:
H. F. Burns.
Eml Gerber.

Inventor:
Hermann G. O. Pabst

UNITED STATES PATENT OFFICE.

HERMANN G. O. PABST, OF CHICAGO, ILLINOIS.

IMPROVEMENT IN FEATHER-RENOVATORS.

Specification forming part of Letters Patent No. 185,868, dated January 2, 1877; application filed July 27, 1876.

*To all whom it may concern:*

Be it known that I, HERMANN G. O. PABST, of the city of Chicago, in the county of Cook and State of Illinois, have invented certain Improvements in Machines for Cleaning and Renovating Feathers, of which the following is a specification, reference being had to the accompanying drawing, and the letters marked thereon.

The object of my invention is to make an apparatus by means of which feathers can be cleaned or renovated by the use of heat. It consists in the construction of an air-tight case divided, by wire-gauze or a perforated plate, in two chambers, the upper one of which is made cylindrical, so as to receive a revolving shaft having arms provided with beaters and stirrers. The lower one takes up the impurities removed from the feathers and falls through the perforated partition. It also contains a hot-air chamber connected with a heating apparatus in such a manner as to regulate the heat to be used, all of which will be hereinafter more fully described.

Figure 1:
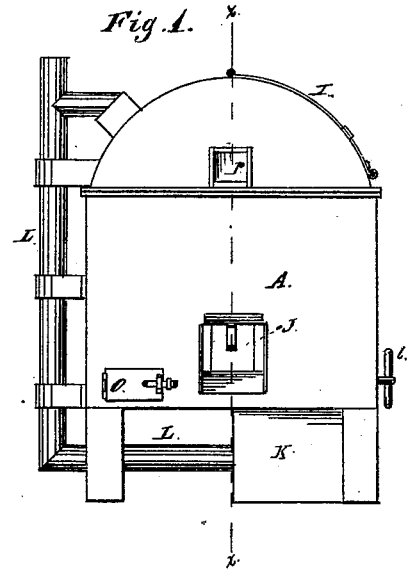
Figure 2:
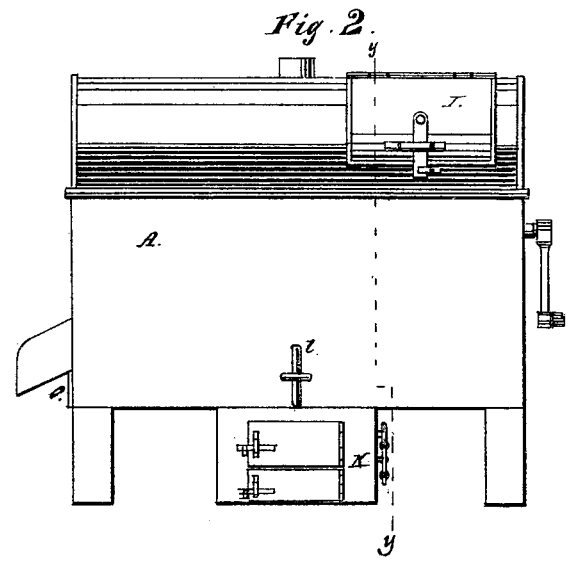
Figure 3:
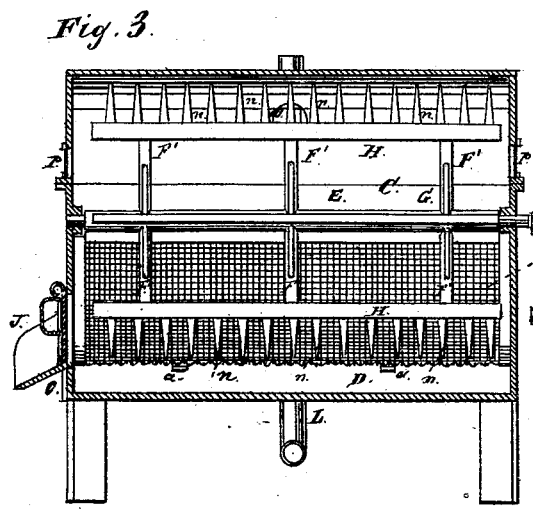
Figure 4:
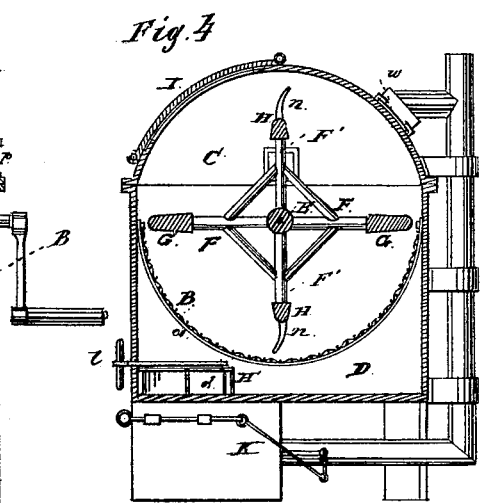
Figure 6:
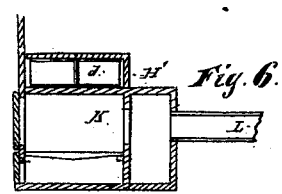
Figure 5:
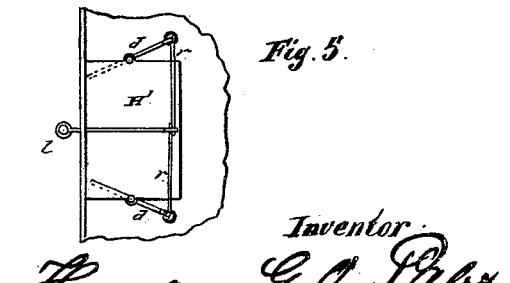

In the accompanying drawing, Figure 1 is an end view of my invention; Fig. 2, a side elevation; Fig. 3, a section taken at the line $x$ $x$ in Fig. 1; Fig. 4, a section taken at the line $y$ $y$ in Fig. 2; Fig. 5, a fractional view of the lower apartment containing the hot-air chamber, with the valves partly opened; Fig. 6, a vertical section through the heating apparatus and hot-air chamber.

A represents the case; B, the wire-gauze or perforated partition; C, the upper chamber, and D the lower one. E is a shaft having bearings in the ends of the cylindrical chamber C. F are arms attached to the shaft E. At the ends of the arms are fastened slats G, to form beaters. F' are arms on the shaft E, having attached to their ends rods provided with curved or bent teeth or pins $n$ $n$ to form combs or stirrers H, for loosening and separating the feathers when clogged or entangled. I is a door, through which the feathers to be cleaned or renovated are put in; and J is a sliding door, through which they are taken away, or driven out by the draft caused by the revolving beaters and stirrers. $a$ $a$ are metallic bands for supporting the partition B. $o$ is a door for removing the impurities out of the lower chamber D. H' is a hot-air chamber, having doors or valves $d$ $d$ pivoted to its sides, and regulated by a handle, $l$. The handle $l$ is connected with the rods $r$ $r$, which are jointed to the ends of the valves $d$ $d$. K is a heating apparatus, and L a chimney-flue having valve $w$. The valve $w$ in the upper chamber, when opened, lets the heat out of the chamber C into the chimney. $p$ $p$ are glasses on the ends of the case for looking into the inside of it when in operation.

Feathers, sold usually in bales, being moist, or, after a long use, becoming moist, and containing grease and other effete matter, may be put into my apparatus without being steamed. The heat, when sufficiently applied, will dry them, so that when the revolving shaft, with its beaters and stirrers, commences to work upon them, all impurities will be easily removed, and fall through the perforated partition into the dirt-chamber, while the feathers come out in a purified or renovated condition.

Having described my invention, what I claim as new, and desire to secure by Letters Patent, is—

The case A, provided with a valve, $w$, hot-air chamber H', having valves $d$ $d$, in combination with a heating apparatus, substantially as specified.

HERMANN G. O. PABST.

Witnesses:
 JACOB BECHTEL,
 EMANUEL GERBÉR.